(12) United States Patent
Kim

(10) Patent No.: US 8,361,645 B2
(45) Date of Patent: Jan. 29, 2013

(54) PROTECTIVE CIRCUIT MODULE AND SECONDARY BATTERY HAVING THE SAME

(75) Inventor: Bongyoung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 958 days.

(21) Appl. No.: 12/413,050

(22) Filed: Mar. 27, 2009

(65) Prior Publication Data

US 2009/0305119 A1 Dec. 10, 2009

(30) Foreign Application Priority Data

Jun. 9, 2008 (KR) .................. 10-2008-0053801

(51) Int. Cl.
*H01M 2/24* (2006.01)

(52) U.S. Cl. .......... 429/158; 429/99; 429/121; 429/123; 429/149; 429/154; 429/160; 429/161; 429/163; 429/175; 429/178; 429/186

(58) Field of Classification Search .............. 429/99, 429/100, 123, 138, 143, 149–163, 167, 175–178, 429/186

See application file for complete search history.

(56) References Cited

U.S. PATENT DOCUMENTS

| | | | | |
|---|---|---|---|---|
| 2002/0098734 | A1* | 7/2002 | Ikeda | 439/500 |
| 2004/0115519 | A1 | 6/2004 | Lee | |
| 2005/0202315 | A1 | 9/2005 | Sugeno et al. | |

FOREIGN PATENT DOCUMENTS

| | | |
|---|---|---|
| JP | 11-195411 | 7/1999 |
| JP | 2002-251986 | 9/2002 |
| KR | 10-2003-0087981 A | 11/2003 |
| KR | 10-2004-0096433 | 11/2004 |
| KR | 10-2005-0075284 A | 7/2005 |
| KR | 10-0650884 B1 | 11/2006 |

OTHER PUBLICATIONS

English machine translation of Japanese publication No. JP 11-195411 dated Jul. 21, 1990 in the name of Takeshita, 6 pages.

* cited by examiner

*Primary Examiner* — Patrick Ryan
*Assistant Examiner* — Ben Lewis
(74) *Attorney, Agent, or Firm* — Christie, Parker & Hale, LLP

(57) ABSTRACT

A secondary battery includes a plurality of bare cells including a first bare cell and a second bare cell and a protective circuit module spaced above the plurality of bare cells. A first lead plate electrically connects the protective circuit module and the first bare cell, the first lead plate having a first foot plate electrically connected to the first bare cell. A second lead plate electrically connects the protective circuit module and the second bare cell, the second lead plate having a second foot plate attached to the second bare cell and arranged generally diagonally from the first foot plate with respect to the protective circuit module.

14 Claims, 5 Drawing Sheets

PROTECTIVE CIRCUIT MODULE AND SECONDARY BATTERY HAVING THE SAME

CROSS-REFERENCE TO RELATED APPLICATION

This application claims priority to and the benefit of Korean Patent Application No. 10-2008-0053801, filed on Jun. 9, 2008 in the Korean Intellectual Property Office, the entire content of which is hereby incorporated by reference.

BACKGROUND OF THE INVENTION

1. Field of the Invention

The present invention relates to a protective circuit module and a secondary battery having the same.

2. Description of the Related Art

A lithium ion secondary battery is generally composed of a positive electrode plate, a negative electrode plate, an electrolyte and a separator, and is capable of repeated use after recharging the battery.

Lithium ion secondary batteries typically include a protective circuit module (PCM) for protecting the battery against excessive charging/discharging or overcurrent. The protective circuit module may include a variety of conductive metal patterns including a protective circuit on a substrate.

The protective circuit module can be connected through a conductive tab (lead plate) to a bare cell including an electrode assembly. In order to secure a space for welding of a positive electrode tab to a cap plate of the bare cell, a portion of the substrate may be cut by a certain length and removed. Further, a side of the substrate where a dummy tab is positioned to balance with the positive electrode tab may also be cut by a certain length and removed.

As a result, the substrate may lack surface area for the installation of devices such as a protective circuit and conductive metal pattern thereon, since a given portion of the substrate was truncated as described above. Further, even though individual devices may be installed on the substrate, the spacing (distance) between the devices may be less than desirable, which may result in high susceptibility to a short circuit even under weak impact.

SUMMARY OF THE INVENTION

A secondary battery includes a plurality of bare cells including a first bare cell and a second bare cell and a protective circuit module spaced above the plurality of bare cells. A first lead plate electrically connects the protective circuit module and the first bare cell, the first lead plate having a first foot plate electrically connected to the first bare cell. A second lead plate electrically connects the protective circuit module and the second bare cell, the second lead plate having a second foot plate attached to the second bare cell and arranged generally diagonally from the first foot plate with respect to the protective circuit module.

In one embodiment, the first lead plate further may include a first stepped plate electrically connected to the protective circuit module and a first tab extending from the stepped plate and electrically connected to the second bare cell; and the second lead plate may include a second stepped plate electrically connected to the protective circuit module and a second tab extending from the second stepped plate and electrically connected to the first bare cell. Further, the first foot plate of the first lead plate may be located proximate a first corner of the protective circuit module and the second foot plate of the second lead plate may be located proximate a second corner of the protective circuit module, the second corner being diagonally opposite to the first corner.

Additionally, the first foot plate and the second foot plate may be spaced from each other and in a generally parallel plane, and the first stepped plate and the second stepped plate may be spaced from each other and in a generally parallel plane. In one embodiment, the protective circuit module may include notches to expose the first foot plate and the second foot plate through the protective circuit module, and the notches may be, for instance, curved or polygonal.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like numbers refer to like elements throughout the specification and drawings.

It should be understood that the term "secondary battery" as used herein encompasses a lithium ion secondary battery and equivalents thereof.

Figure 1:
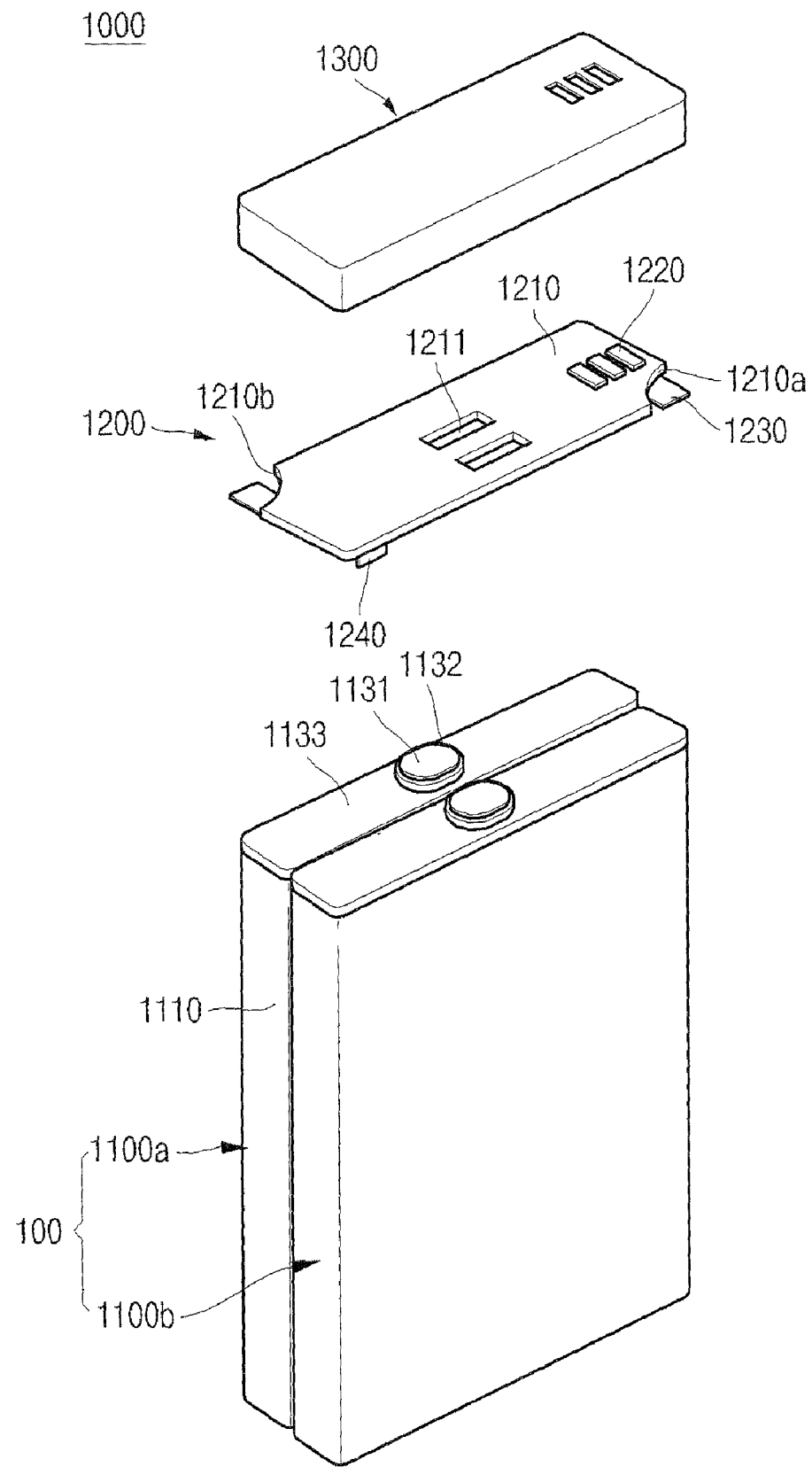
FIG. 1 is a partially exploded perspective view of a secondary battery in accordance with an embodiment of the present invention.
Figure 2:
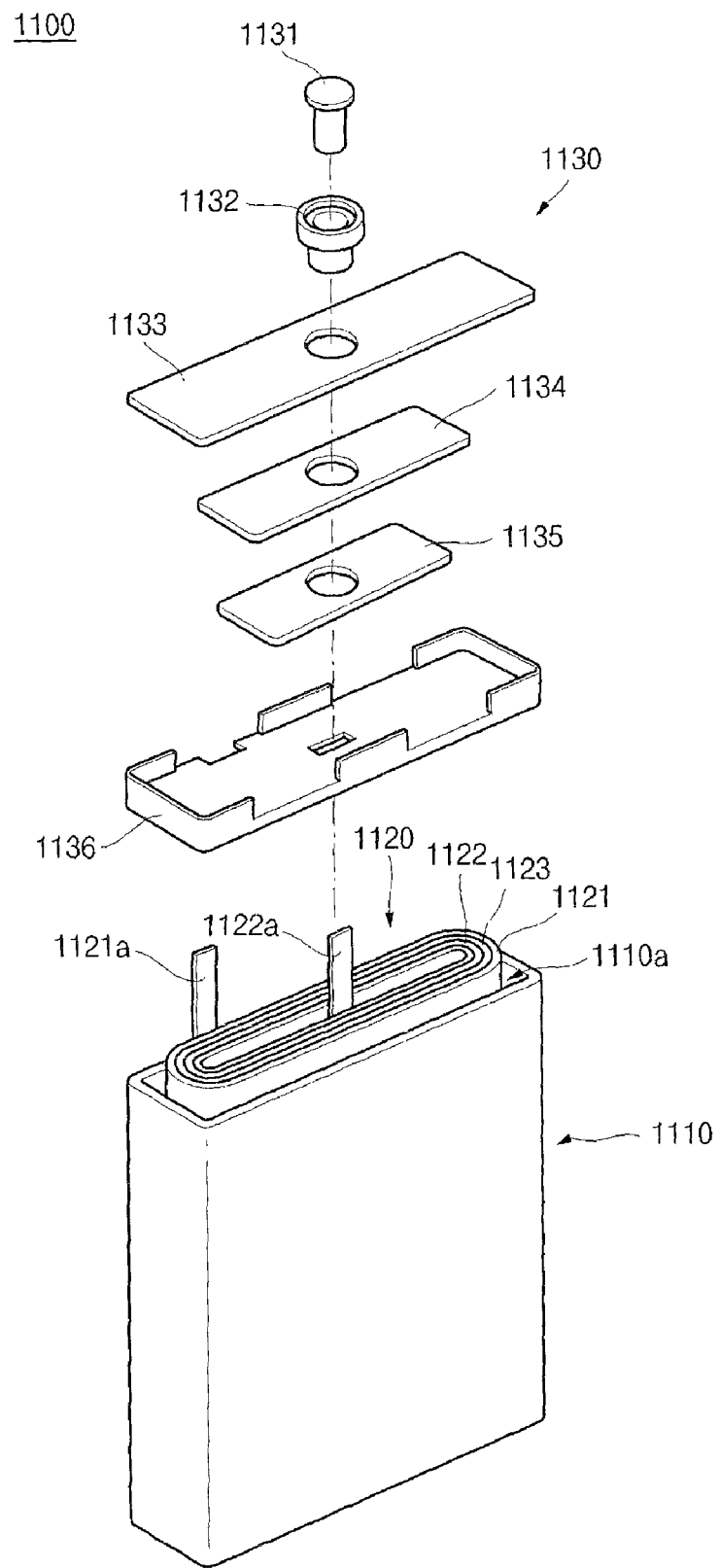
FIG. 2 is a partially exploded view of a bare cell in accordance with an embodiment of the present invention.
Figure 3:
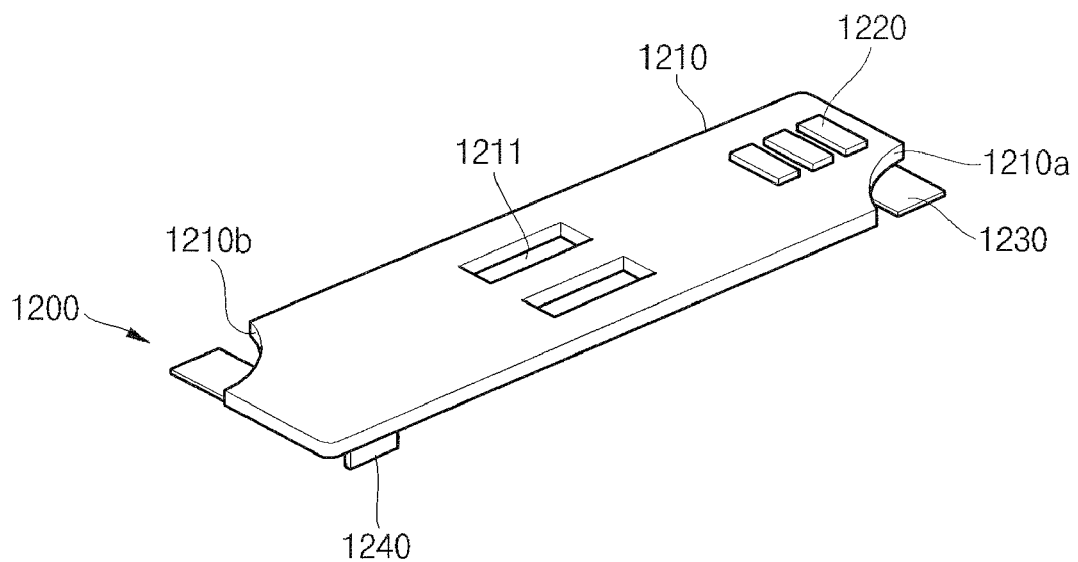
FIG. 3 is a perspective view of a protective circuit module in accordance with an embodiment of the present invention.

Referring to FIGS. 1-3, a secondary battery 1000 in accordance with an embodiment of the present invention may comprise a plurality of bare cells 1100 including a first bare cell 1100*a* and a second bare cell 1100*b*, a protective circuit module 1200 disposed over the bare cell 1100 and a cover 1300 disposed over and covering the protective circuit module 1200. The protective circuit module 1200 can be electrically connected to the first bare cell 1100*a* and the second bare cell 1100*b* through a first lead plate 1230 and a second lead plate 1240 that will be described hereinafter.

The bare cell 1100 in accordance with an embodiment of the present invention may be composed of the first bare cell 1100*a* and the second bare cell 1100*b*. The first bare cell 1100*a* and the second bare cell 1100*b* can be connected in a parallel relationship to each other. Even though the first bare cell 1100*a* will be described hereinafter, structural components of the second bare cell 1100*b* are substantially identical to those of the first bare cell 1100*a*, so details of the second bare cell 1100*b* will be omitted herein.

The first bare cell 1100*a* can be fabricated by combining a can 1110, an electrode assembly 1120 and a cap assembly

1130. The electrode assembly 1120 is inserted through an open upper part 1110a formed on one side of the can 1110, and the open upper part 1110a can be hermetically sealed by the cap assembly 1130. The first bare cell 1100 has positive and negative electrodes of opposite polarity, and may be a minimum unit of the secondary battery 1000 capable of performing a charging/discharging process.

The can 1110 may be of an open-topped generally rectangular shape having an open upper part 1110a. The can 1110 may be formed of a light-weight metal such as aluminum (Al), and may also serve as a terminal. The can 1110 can accommodate the electrode assembly 1120 and an electrolyte through the open upper part 1110a.

The electrode assembly 1120 may include a first electrode plate 1121, a second electrode plate 1122 and a separator 1133. The electrode assembly 1120 is fabricated by stacking the first electrode plate 1121, the second electrode plate 1122 and the separator 1133 therebetween and winding the resulting stacked structure into a jelly roll shape.

A first electrode tab 1121a and a second electrode tab 1122a are attached to one side of the first electrode plate 1121 and the second electrode plate 1122, respectively and then extend toward the open upper part 1110a of the can 1110.

Generally in the secondary battery 1000, the can 1110 serving as a terminal may be a positive electrode. If the first electrode plate 1121 is a positive electrode, the outermost electrode plate of a jelly-roll electrode assembly 1120 may be the first electrode plate 1121 that corresponds to the positive electrode. If the first electrode plate 1121 is a negative electrode, the outermost electrode plate of a jelly-roll electrode assembly 1120 may be the second electrode plate 1122 that corresponds to the positive electrode.

Upon charging of the electrode assembly 1120, lithium ions migrate into the second electrode plate 1122 from the first electrode plate 1121 (intercalation). In contrast, upon discharging, lithium ions migrate into the first electrode plate 1121 from the second electrode plate 1122 (deintercalation). As a result, a voltage can be applied to external equipment via such a repeated intercalation/deintercalation process of lithium ions from the first electrode plate 1121 to the second electrode plate 1122 or vice versa.

Hereinafter, an embodiment will be illustrated wherein the first electrode plate 1121 is a positive electrode and the second electrode plate 1122 is a negative electrode.

The cap assembly 1130 may include an electrode terminal 1131, a gasket 1132, a cap plate 1133, an insulating plate 1134 and a terminal plate 1135. The cap assembly 1130 in conjunction with a separate insulating case 1136 is combined into the electrode assembly 1120 at the open upper part 1110a of the can 1110, thus hermetic sealing of the can 1110.

The electrode terminal 1131 is inserted through the gasket 1132, the cap plate 1133, the insulating plate 1134 and a terminal through-hole of the terminal plate 1135 and then electrically connected to the first electrode tab 1121a of the electrode assembly 1120. The second electrode tab 1122a can be electrically connected to either side of the cap plate 1133 arranged opposite to the second electrode tab 1122a. The electrode terminal 1131 may be a negative electrode terminal.

The protective circuit module 1200 may include a substrate 1210, a charge/discharge terminal 1220, a first lead plate 1230, a second lead plate 1240 and a third lead plate 1250. Further, the protective circuit module 1200 may include a conductive metal pattern (not shown), a protective circuit part (not shown) and a test terminal (not shown) on the substrate 1210. The protective circuit module 1200 protects the assembled battery against overcharging and overcurrent and prevents performance deterioration of the battery due to over-discharging. It should be understood that the first lead plate 1230, the second lead plate 1240 and the third lead plate 1250 may also be incorporated into the protective circuit module 1200, even though they are not components necessary for construction of the protective circuit module 1200. The cover case 1300 is disposed over the protective circuit module 1200, and serves to protect the protective circuit module 1200 via connection with the bare cell 1100, particularly the cap plate 1133.

The conductive metal pattern and the protective circuit part are installed on the substrate 1210 that may be then fabricated in the form of a multi-stacked structure consisting of a plurality of substrates 1210. The substrate 1210 may be formed of an epoxy or bakelite material.

Passive and active elements including a protective circuit can be electrically connected to the conductive metal pattern. The protective circuit can protect the battery by checking information such as charging/discharging state, current, voltage, and temperature of the battery.

The test terminal (not shown) is electrically connected to the protective circuit and the conductive metal pattern and therefore can provide an electrical path to determine whether the protective circuit is functioning normally.

The charge/discharge terminal 1220 can provide an electrical path for communication with external equipment through electrical connection with the protective circuit part and the conductive metal pattern.

The first lead plate 1230 may be electrically connected, such as by soldering, to one side of the protective circuit module 1200. The first lead plate 1230 can provide electrical connection between the protective circuit module 1200 and the cap assembly 1130, and more specifically the cap plate 1133. The cap plate 1133 may seal the open upper part 1110a of the can 1110 in the first bare cell 1100, and the cap plate 1133 and the first lead plate 1230 may be a positive electrode terminal and a positive electrode lead plate, respectively. The first lead plate 1230 may be laser-welded to the cap plate 1133. The first lead plate 1230 may be formed of at least one selected from nickel (Ni), aluminum (Al), a nickel alloy and an aluminum alloy.

The second lead plate 1240 may be electrically connected, such as by soldering, to be connected to the other side of the protective circuit module 1200 arranged opposite to the first lead plate 1230. The second lead plate 1240 can provide electrical connection between the protective circuit module 1200 and the cap assembly 1130, and more specifically the cap plate 1133. The cap plate 1133 and the second lead plate 1240 may be a positive electrode terminal and a positive electrode lead plate, respectively. The second lead plate 1240 may be laser-welded to the cap plate 1133. The second lead plate 1240 may be formed of at least one selected from nickel (Ni), aluminum (Al), a nickel alloy and an aluminum alloy.

The first lead plate 1230 and the second lead plate 1240 welded to the first bare cell 1100a and the second bare cell 1100b, respectively, can be arranged to face in opposite directions with respect to the protective circuit module 1200. More specifically, as described in more detail below, a foot plate 1231 of the first lead plate 1230 may be located at a first corner of the protection circuit substrate, and a foot plate 1241 of the second lead plate 1240 may be located at a second corner, diagonally opposite the first corner of the protection circuit substrate. Even though the first lead plate 1230 and the second lead plate 1240 have the same structure, these plates may be oppositely arranged on the protective circuit module 1200. Details of such a structure will be illustrated hereinafter with reference to FIGS. 3 and 4.

Figure 4:
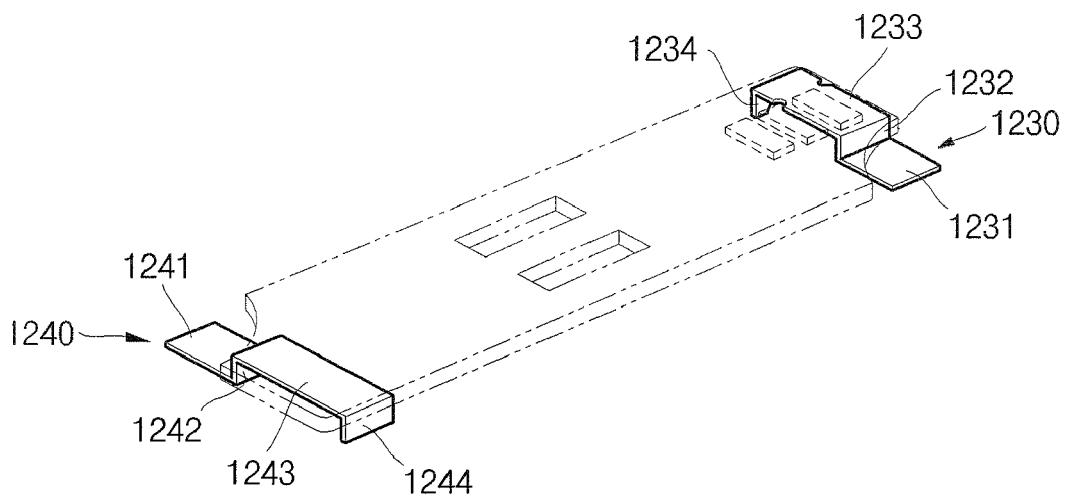
FIG. 4 is a perspective view of a first lead plate and a second lead plate in accordance with an embodiment of the present invention.

Referring to FIGS. 3 and 4 in conjunction with FIG. 1, the first and second lead plates 1230, 1240 may each include a foot plate 1231, 1241 welded to the cap assembly 1130 extending via a riser 1232, 1242 to a stepped plate 1233, 1243 electrically connected to the protective circuit module 1200. A tab 1234, 1244 extends from an edge of the stepped plate 1233, 1243 opposite the riser 1232, 1242 to electrically connect the protective circuit module 1200 to the cap assembly 1130, and more specifically to the cap plate 1133. In one embodiment, the foot plate 1231 of the first lead plate 1230 is attached to the first bare cell 1100a and the tab 1234 is attached to the second bare cell 1100b, and the foot plate 1241 of the second lead plate 1240 is attached to the second bare cell 1100b and the tab 1244 is attached to the first lead plate 1230. In one embodiment, the foot plates 1231, 1241 are spaced from each other and are in a first plane, and the stepped plates 1233, 1243 are spaced from each other and are in a second plane generally parallel to the first plane.

The foot plates 1231, 1241 can be electrically connected to the cap assembly 1130 of the bare cell 1100, and more specifically to the cap plate 1133. In one embodiment, the foot plate 1231 of the first lead plate 1230 is electrically connected to the first bare cell 1100a, and the foot plate 1241 of the second lead plate 1240 is electrically connected to the second bare cell 1100b.

The risers 1232, 1242 extend between the foot plates 1231, 1241 and the stepped plates 1233, 1243 to provide spacing between the protective circuit module 1200 and the bare cell 1100. The stepped plates 1233, 1243 that extend substantially perpendicularly from the risers 1232, 1242 may be electrically connected to the protective circuit module 1200.

The tabs 1234, 1244 extend substantially perpendicularly from the stepped plates 1233, 1243 opposite an edge from which the risers extend and may be electrically connected to the bare cell 1100. Similarly to the risers 1232, 1242, the tabs 1234, 1244 extend between the protective circuit module 1200 and the bare cell 1100 to provide spacing therebetween.

The first lead plate 1230 and the second lead plate 1240 are structurally substantially identical to each other. However, when the first lead plate 1230 and the second lead plate 1240 are disposed on either side of the protective circuit module 1200, these plates may be arranged in opposite-facing directions with respect to the protective circuit module 1200. More specifically, when the foot plate 1231 of the first lead plate 1230 is disposed on a first side of the secondary battery 1000, the foot plate 1241 of the second lead plate 1240 may be disposed on a second opposite of the secondary battery 1000. In this manner, the corresponding parts of the foot plate 1231 of the first lead plate 1230 and the foot plate 1241 of the second lead plate 1240 connected to the bare cell 1100 can be arranged diagonally opposite with respect to the protective circuit module 1200.

A corner 1210a of the substrate 1210 corresponding to the foot plate 1231 in the first lead plate 1230 may be truncated to expose the foot plate 1231. In other words, the corner 1210a may be notched to expose the foot plate 1231. Similarly, a corner 1210b of the substrate 1210 corresponding to the foot plate 1241 of the second lead plate 1240 may also be truncated or notched to expose the foot plate 1241. The truncated corners 1210a, 1210b of the protective circuit module 1200 may have a curvature.

A plurality of the foot plates 1231 can be welded to a plurality of the bare cells 1100 by laser beams irradiated through the truncated portion or notch. More specifically, the foot plate 1231 can be welded to the cap assembly 1130 of the bare cell 1100. The foot plate 1231 of the first lead plate 1230 can be welded to the foot plate 1231 of the first bare cell 1100, whereas the foot plate 1241 of the second lead plate 1240 can be welded to the second bare cell 1100. Herein, connection between the foot plates 1231, 1241 and the cap assembly 1130 may be established by the aforementioned laser welding, as well as other welding techniques such as spot welding and resistance welding. Alternatively, physical connection methods such as screw fixation, spinning coupling, and the like may also be used.

A conventional secondary battery, particularly a secondary battery having a structure of two bare cells connected parallel to each other, has a plurality of lead plates disposed only on one side of the protective circuit module. That is, the first lead plate connecting the first bare cell and the protective circuit module, and the second lead plate connecting the second bare cell and the protective circuit module are disposed only on a first side of the protective circuit module. For this reason, in order to achieve structural stability between the protective circuit module and the bare cell, a second opposite side of the protective circuit module is provided with dummy plates that have the same structure as the lead plates. Therefore, in such a protective circuit module, a certain area where the lead plates and the dummy plates are connected to the bare cells does not include the substrate. As a consequence, there may be a lack of surface area for installation of the protective circuit part or the conductive metal pattern on the substrate.

In the secondary battery 1000 in accordance with an embodiment of the present disclosure, the first lead plate 1230 and the second lead plate 1240 may be disposed on either side 1210a, 1210b of the protective circuit module 1200, respectively. As a consequence, even when there is no dummy plate, the first lead plate 1230 and the second lead plate 1240 support a given spacing between the protective circuit module 1200 and the bare cell 1100, thus resulting in structural stability of the battery.

The secondary battery 1000 in accordance with an embodiment of the present disclosure can secure a given portion of the substrate 1210 previously excluded for connection of the dummy plate with the bare cell 1100, as a space for the installation of the protective circuit part and the conductive metal pattern. Therefore, it is possible to achieve monolayer structuring of the protective circuit module 1200, resulting in size reduction and weight reduction of the secondary battery 1000, in conjunction with decreased production costs. Further, it is possible to eliminate additional processes and reduce production costs that may result from formation of the dummy plate and subsequent welding of the dummy plate to the bare cell 1100.

Figure 5:
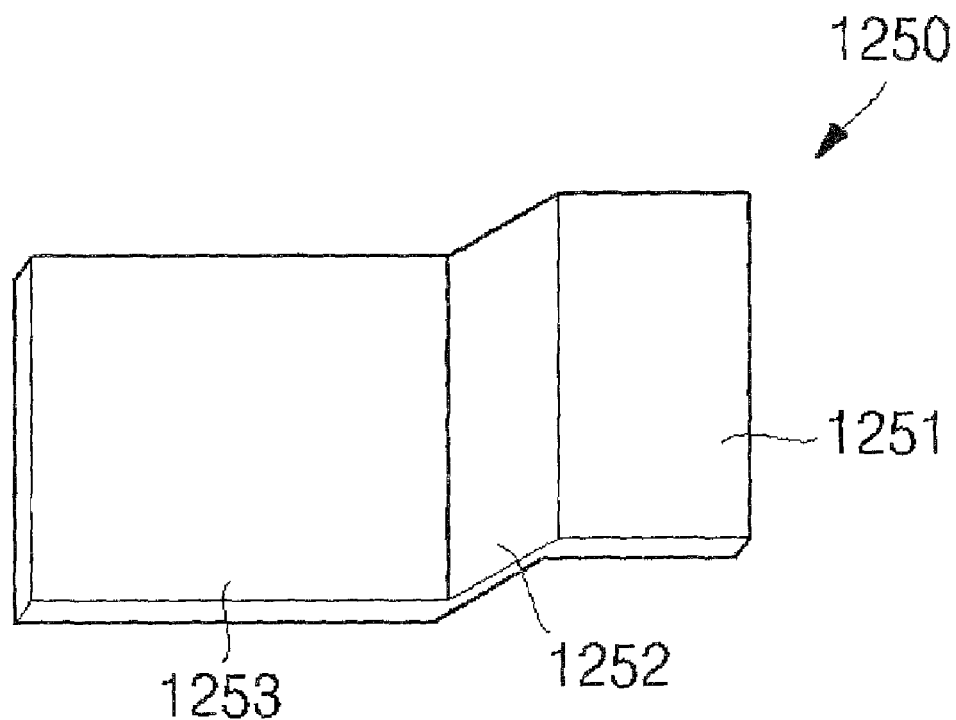
FIG. 5 is a perspective view of a third lead plate in accordance with an embodiment of the present invention.
Figure 6:
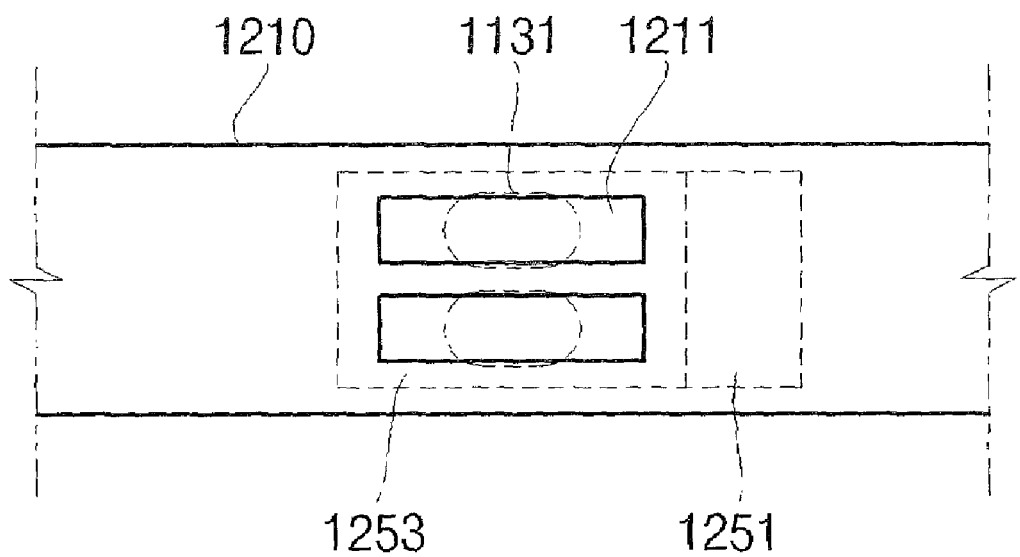
FIG. 6 is a plan view showing a connected electrode terminal and third lead plate in accordance with an embodiment of the present invention.

With reference to FIGS. 5 and 6, the third lead plate 1250 may be electrically connected to a lower surface of the protective circuit module 1200 arranged opposite to the electrode terminal 1131 of the first bare cell 1100a and the second bare cell 1100b. The third lead plate 1250 can provide electrical connection between the protective circuit module 1200 and the electrode terminals 1131 protruding above the cap assembly 1130. The electrode terminal 1131 and the third lead plate 1250 may be a negative electrode terminal and a negative electrode lead plate, respectively. The third lead plate 1250 may be formed of at least one selected from nickel (Ni), aluminum (Al), a nickel alloy and an aluminum alloy.

More specifically, the third lead plate 1250 may include a third stepped plate 1251 electrically connected to the protective circuit module 1200 and extending via a third riser 1252 between the protective circuit module 1200 and the electrode terminal 1131 to a third foot 1253 generally parallel to the third stepped plate 1251 and electrically connected, such as by welding, to a plurality of electrode terminals 1131.

The third stepped plate 1251 may be electrically connected adjacent to a hole 1211 disposed at about the center of the protective circuit module 1200.

The third riser 1252 may extend at an acute angle between the third stepped plate 1251 and the third foot plate 1253 to provide a spacing between the protective circuit module 1200 and the bare cell 1100, and more specially between the protective circuit module 1200 and the electrode terminal 1131.

The third foot plate 1253 may be welded to the electrode terminals 1131 of the first bare cell 1100a and the second bare cell 1100b.

Figure 7:
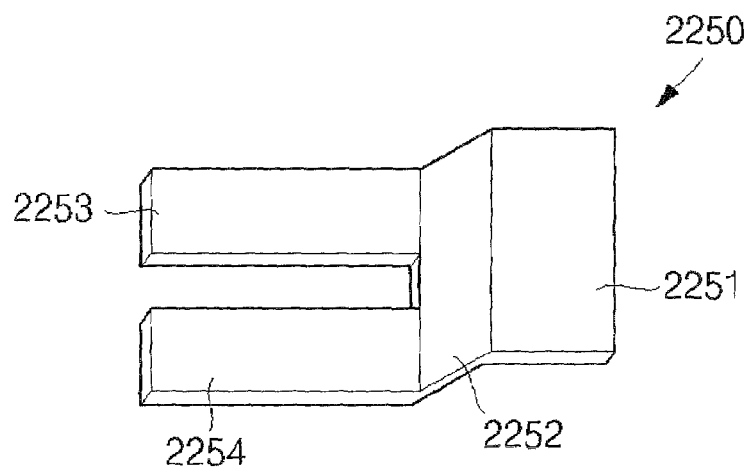
FIG. 7 is a perspective view of a third lead plate in accordance with another embodiment of the present invention.

FIG. 7 is a perspective view of a third lead plate 2250 in accordance with another embodiment of the present disclosure.

Referring to FIG. 7 in conjunction with FIG. 1, the third lead plate 2250 in accordance with another embodiment of the present disclosure may include a third stepped plate 2251 electrically connected to the protective circuit module and extending via a third riser 2252 between the protective circuit module 2200 and the electrode terminal 1131 to a slotted foot plate including first and second toes 2253, 2254. The first toe 2253 may be electrically connected, such as by welding, to the electrode terminal 1131 of the first bare cell 1100a, and the second toe 2254, spaced from and substantially parallel to the first toe 2253, may be electrically connected to the electrode terminal 1131 of the second bare cell 1100b.

The third stepped plate 2251 may be electrically connected adjacent to a hole 2211 disposed at generally the center of the protective circuit module 2200.

Even though the protective circuit module and the hole are not shown in FIG. 7, it should be understood that an embodiment of the third lead plate was altered or modified as compared to the structure of FIG. 1 to FIG. 6, so reference numerals for the protective circuit module including the third lead plate and other elements incorporated therein were also renumbered in compliance with all such variations.

The configuration of the secondary battery except for the structure of the third lead plate 2250 is the same as that in FIGS. 1 to 6, so details thereof will be omitted herein.

Figure 8:
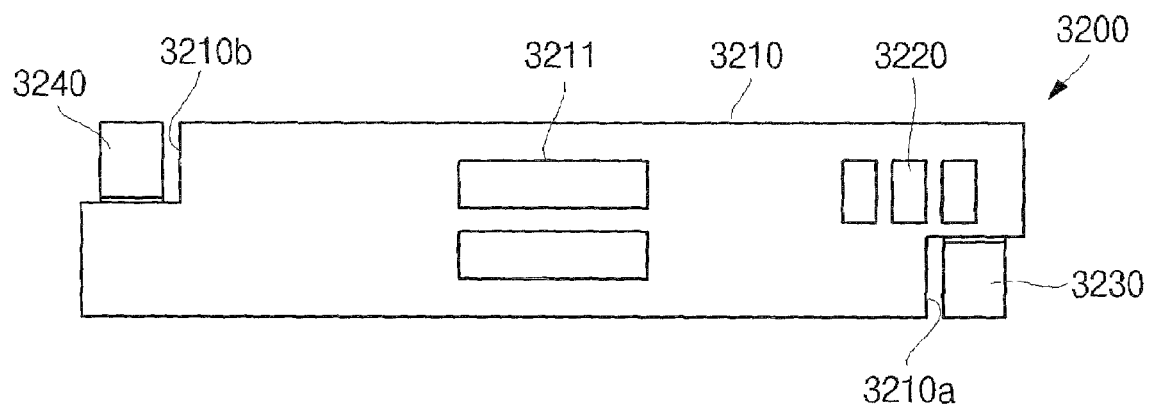
FIG. 8 is a plan view of a protective circuit module in accordance with a further embodiment of the present invention.

FIG. 8 is a plan view of a protective circuit module 3200 in accordance with a further embodiment of the present disclosure.

Referring to FIG. 8, the truncated corners or notches 3210a, 3210b of substrate 3210 in accordance with a further embodiment of the present invention may be of a polygonal shape, preferably a square shape.

The substrate 3210 has a square-shaped corner which facilitates precision pointing of laser beams or the like, upon welding between the foot plate 1231 and the cap plate 1133.

The configuration of the secondary battery, including first and second lead plates 3230, 3240, and through holes 3211, 3220, except for the shape of the corners 3210a, 3210b of the substrate 3210 is the same as that in FIGS. 1 to 7, so details thereof will be omitted herein.

As apparent from the above description, a protective circuit module in accordance with one embodiment of the present disclosure and a secondary battery comprising the same enable elimination of a dummy plate via the formation of lead plates on either side of a protective circuit module.

Therefore, the present disclosure enables a size reduction and weight reduction of a secondary battery via monolayer structuring of the protective circuit module by eliminating the need for a dummy plate and thereby increasing a surface area of the protective circuit module available for the installation of further components.

Further, it is possible to eliminate additional processes and reduce production costs associated with the formation and consequent welding of the dummy plate.

Although embodiments of the present invention have been described with reference to the attached drawings, those skilled in the art will appreciate that various modifications, additions and substitutions are possible, without departing from the scope and spirit of the disclosure as disclosed in the accompanying claims. It should be understood that the embodiments and the accompanying drawings have been disclosed for illustrative purposes only and the present disclosure is limited only by the following claims. Furthermore, it is to be understood that various modifications, additions and substitutions that can be derived from the equivalent concepts of the accompanying claims and drawings fall within the scope of the present invention.

What is claimed is:

1. A secondary battery comprising:
   a plurality of bare cells including a first bare cell and a second bare cell, wherein each of the bare cells comprises a cap plate;
   a protective circuit module spaced above the plurality of bare cells;
   a first lead plate electrically connecting the protective circuit module and the first bare cell, the first lead plate comprising a first foot plate electrically connected to the first bare cell; and
   a second lead plate electrically connecting the protective circuit module and the second bare cell, the second lead plate comprising a second foot plate attached to the second bare cell and arranged generally diagonally from the first foot plate with respect to the protective circuit module, wherein the first lead plate and the second lead plate both directly contact the cap plate of the first bare cell and the cap plate of the second bare cell.

2. The battery according to claim 1, wherein the first lead plate further comprises a first stepped plate electrically connected to the protective circuit module and a first tab extending from the first stepped plate and electrically connected to the second bare cell and the second lead plate further comprises a second stepped plate electrically connected to the protective circuit module and a second tab extending from the second stepped plate and electrically connected to the first bare cell.

3. The battery according to claim 2, wherein the first foot plate of the first lead plate is located proximate a first corner of the protective circuit module and the second foot plate of the second lead plate is located proximate a second corner of the protective circuit module, the second corner being diagonally opposite to the first corner.

4. The battery according to claim 2, wherein the first foot plate and the second foot plate are spaced from each other in a first plane, and wherein the first stepped plate and the second stepped plate are spaced from each other in a second plane generally parallel to the first plane.

5. The battery according to claim 2, wherein the protective circuit module includes notches to expose the first foot plate and the second foot plate through the protective circuit module.

6. The battery according to claim 5, wherein the notches of the protective circuit module are curved.

7. The battery according to claim 5, wherein the notches of the protective circuit module are polygonal.

8. The battery according to claim 1, wherein the first lead plate and the second lead plate are positive electrode lead plates.

9. The battery according to claim 1, wherein the first bare cell and the second bare cell each include a can, an electrode assembly and a cap assembly having an electrode terminal, and wherein the protective circuit module includes a third lead plate electrically connected to each electrode terminal.

10. The battery according to claim 9, wherein the third lead plate comprises:
   a third stepped plate electrically connected to the protective circuit module;
   a third riser extending from the third stepped plate and extending between the protective circuit module and each electrode terminal; and
   a third foot plate connected to the third riser and welded to each electrode terminal.

11. The battery according to claim 10, wherein the third foot plate is a slotted foot plate comprising:
   a first toe extending from the third riser and electrically connected to an electrode terminal of the first bare cell; and
   a second toe extending from the third riser and spaced from and substantially parallel to the first toe, the second toe electrically connected to an electrode terminal of the second bare cell.

12. A protective circuit module electrically connected to a plurality of bare cells including a first bare cell and a second bare cell, each of the bare cells comprises a cap plate, the protective circuit module comprising:
   a substrate;
   a protective circuit and a conductive metal pattern on the substrate;
   a first lead plate electrically connecting the protective circuit module and the first bare cell, the first lead plate comprising a first foot plate electrically connected to the first bare cell;
   a second lead plate electrically connecting the protective circuit module and the second bare cell, the second lead plate comprising a second foot plate attached to the second bare cell and arranged generally diagonally from the first foot plate with respect to the protective circuit module; wherein the first lead plate and the second lead plate both directly contact the cap plate of the first bare cell and the cap plate of the second bare cell.

13. The protective circuit module according to claim 12, wherein the first lead plate further comprises a first stepped plate electrically connected to the protective circuit module and a first tab extending from the first stepped plate and electrically connected to the second bare cell and the second lead plate comprises further comprises a second stepped plate electrically connected to the protective circuit module and a second tab extending from the second stepped plate and electrically connected to the first bare cell.

14. The protective circuit module according to claim 13, wherein the substrate includes notches to expose the first foot plate and the second foot plate through the protective circuit module.

* * * * *

UNITED STATES PATENT AND TRADEMARK OFFICE
CERTIFICATE OF CORRECTION

PATENT NO. : 8,361,645 B2  
APPLICATION NO. : 12/413050  
DATED : January 29, 2013  
INVENTOR(S) : Bongyoung Kim Page 1 of 1

It is certified that error appears in the above-identified patent and that said Letters Patent is hereby corrected as shown below:

In the Claims

Column 10, Claim 13, line 20  After "plate"

Delete "comprises"

Signed and Sealed this  
Twenty-first Day of October, 2014

Michelle K. Lee  
*Deputy Director of the United States Patent and Trademark Office*